United States Patent
MacArthur

(10) Patent No.: US 12,012,315 B2
(45) Date of Patent: Jun. 18, 2024

(54) WINGED STOPPER FOR OVERHEAD RAIL SYSTEM

(71) Applicant: Honda Motor Co., Ltd., Tokyo (JP)

(72) Inventor: Benjamin B. MacArthur, Barrie (CA)

(73) Assignee: Honda Motor Co., Ltd., Tokyo (JP)

(*) Notice: Subject to any disclaimer, the term of this patent is extended or adjusted under 35 U.S.C. 154(b) by 759 days.

(21) Appl. No.: 17/185,585

(22) Filed: Feb. 25, 2021

(65) Prior Publication Data
US 2022/0267962 A1    Aug. 25, 2022

(51) Int. Cl.
| | |
|---|---|
| B66C 7/16 | (2006.01) |
| B65G 1/04 | (2006.01) |
| B66C 7/02 | (2006.01) |
| B66C 7/04 | (2006.01) |
| B66C 7/08 | (2006.01) |
| E01B 25/24 | (2006.01) |

(52) U.S. Cl.
CPC ............ B66C 7/16 (2013.01); B65G 1/0457 (2013.01); B66C 7/02 (2013.01); B66C 7/04 (2013.01); B66C 7/08 (2013.01); E01B 25/24 (2013.01); *B66C 2700/018* (2013.01)

(58) Field of Classification Search
CPC .... B66C 7/02; B66C 7/04; B66C 7/08; B66C 7/16; B66C 7/00; B66C 7/06; E01B 25/24; E01B 25/22; B65G 1/0457; B61B 10/025
See application file for complete search history.

(56) References Cited

U.S. PATENT DOCUMENTS 1,254,683 A * 1/1918 Grapevine ............ B61B 10/025
                                                         104/250
3,559,585 A * 2/1971 Lempio ................. B61B 10/025
                                                         104/172.4
(Continued)

FOREIGN PATENT DOCUMENTS

CN    202337528 U  *  7/2012
CN    202337528 U     7/2012
(Continued)

OTHER PUBLICATIONS

FOBA Stopper for Mega-Track https://www.bhphotovideo.com/c/product/337791-REG/Foba_RIGIE_Endbuffer_to_Megatrack.html.
(Continued)

*Primary Examiner* — Zachary L Kuhfuss
*Assistant Examiner* — Cheng Lin
(74) *Attorney, Agent, or Firm* — Mark E. Duell; American Honda Motor Co., Inc.

(57) ABSTRACT

An overhead rail system includes a hollow tube having a channel running longitudinally along a bottom surface of the overhead rail. A stopper for use in the overhead rail, includes a base having a thickness less than a width of the channel of the overhead rail, a base length, a base width, and first and second countersunk threaded holes. The base further includes a pair of wings having a length greater than a width. The wings are rotatably attached to ends of the base and are rotatable approximately 90 degrees between a first position and a second position. Bolts may attach a stopper portion including a stopper base, and bumper base, and a bumper. The bolts further prevent rotation of the wings, thus securing the stopper in the overhead rail.

20 Claims, 4 Drawing Sheets

(56) References Cited

U.S. PATENT DOCUMENTS

| | | | | |
|---|---|---|---|---|
| 3,690,269 | A | * | 9/1972 | Hempstead ............ B61B 10/025 104/172.4 |
| 4,542,698 | A | * | 9/1985 | Wakabayashi .......... B61B 10/04 104/130.09 |
| 4,898,099 | A | * | 2/1990 | Summa ................... B61B 10/04 104/252 |
| 5,549,049 | A | * | 8/1996 | Deandrea ................ E01B 25/24 104/111 |
| 8,499,988 | B2 | | 8/2013 | Garland et al. |
| 8,627,942 | B2 | * | 1/2014 | Terazawa ............... B62D 65/18 198/465.1 |
| 9,091,026 | B2 | * | 7/2015 | Spies ........................ B66C 7/08 |
| 11,820,630 | B2 | * | 11/2023 | Zaguroli, Jr. ............ B60M 1/12 |

FOREIGN PATENT DOCUMENTS

| | | | | |
|---|---|---|---|---|
| CN | 104270925 | A | | 1/2015 |
| CN | 110304544 | A | * | 10/2019 |
| CN | 210140384 | U | | 3/2020 |
| EP | 1215160 | A1 | * | 6/2002 ............. F16C 29/00 |
| EP | 1215160 | A1 | | 6/2002 |

OTHER PUBLICATIONS

End Stops Program 1400, KAT1400-0001-E Overhead Monorail Systems, p. 17 https://powerflex.as/wp-content/uploads/2018/09/KAT1400-0001-E_Overhead_Monorail_Systems.pdf.

* cited by examiner

WINGED STOPPER FOR OVERHEAD RAIL SYSTEM

TECHNICAL FIELD

The embodiments described herein related to an overhead rail stopper installable anywhere on an overhead rail without the need to components on the overhead rail.

BACKGROUND

An overhead rail system in a manufacturing environment may include several components hanging from the rails, such as trolleys or hanging equipment. The components may include rollers that allow them to move from one location to another. In order the prevent the components from hitting each other, such as when the manufacturing environment needs to be converted for a change in production, stoppers may be included in the rails. However, there may be a need to relocate or remove a stopper in the overhead rail. In order to facilitate the conversion of the manufacturing environment from one configuration to another, there is a need to facilitate the relocation or removal of stoppers during the conversion process.

APPLICATION SUMMARY

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

According to one aspect, a stopper for an overhead rail of an overhead rail system, the overhead rail including a hollow tube having a channel running longitudinally along a bottom surface of the overhead rail, includes a base, the base having a thickness less than a width of the channel of the overhead rail, a base length, a base width and a first countersunk threaded hole, and a first wing having a first length greater than a first width, the first wing being rotatably attached to a first end of the base.

According to another aspect, a overhead rail system for a manufacturing facility includes an overhead rail. The over rail includes a hollow tube having a channel running longitudinally along a bottom surface of the overhead rail. The overhead rail system further includes a stopper including a base, the base having a thickness less than a width of the channel of the overhead rail, a base length, a base width and first and second countersunk threaded holes, and a first wing having a first length greater than a first width, the first wing being rotatably attached to a first end of the base and rotatable approximately 90 degrees between a first position and a second position.

According to yet another aspect, a stopper for an overhead rail of an overhead rail system, the overhead rail including a hollow tube having a channel running longitudinally along a bottom surface of the overhead rail, includes a base, the base having a thickness less than a width of the channel of the overhead rail, a base length, a base width and first and second countersunk threaded holes, a first wing having a first length greater than a first width, the first wing being rotatably attached to a first end of the base and rotatable approximately 90 degrees between a first position and a second position, and a second wing having a second length greater than a second width, the second wing being rotatably attached to a second end of the base and rotatable approximately 90 degrees between a first position and a second position.

The figures depict various embodiments for purposes of illustration only. One skilled in the art will readily recognize from the following discussion that alternative embodiments of the structures and methods illustrated herein may be employed without departing from the principles of the embodiments described herein.

DETAILED DESCRIPTION

Figure 1:
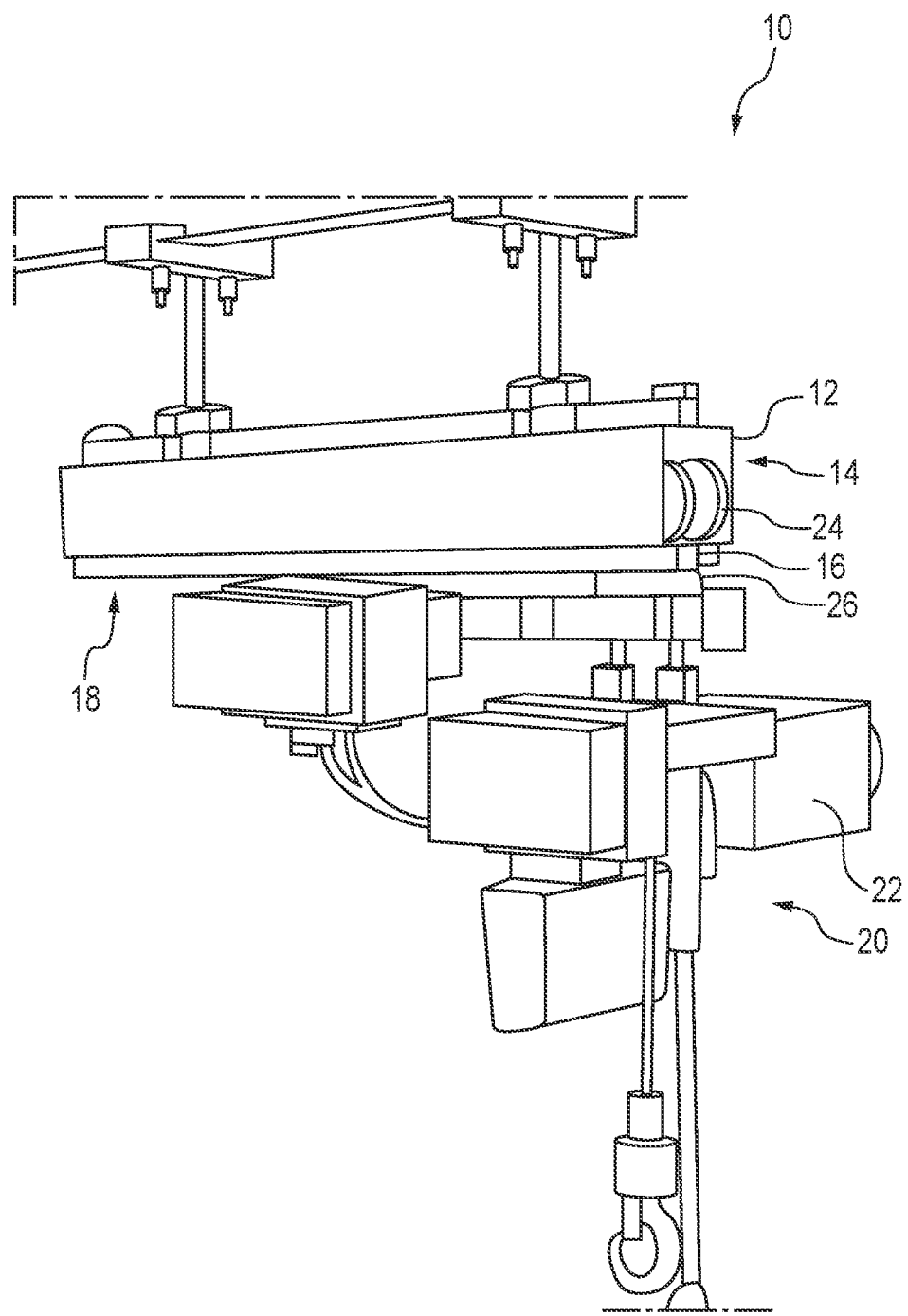
FIG. 1 is side view of an overhead rail system.

FIG. 1 illustrates an overhead rail 12 of an overhead rail system 10. The overhead rail 12 includes a hollow tube 14 having a channel 16 running longitudinally along a bottom surface 18 of the overhead rail 12. A component 20, such as trolleys or hanging equipment, may include an operative portion 22 that hangs beneath the overhead rail 12. The component 20 further includes a roller 24 disposed inside the overhead rail 12 that is connected to the operative portion 22 by a narrow neck 26 that is disposed through the channel 16. The component 20 may be moved with the narrow neck 26 moving through the channel 16 and the roller 24 enabling the component 20 to roll along the overhead rail 12 to another location.

Figure 2:
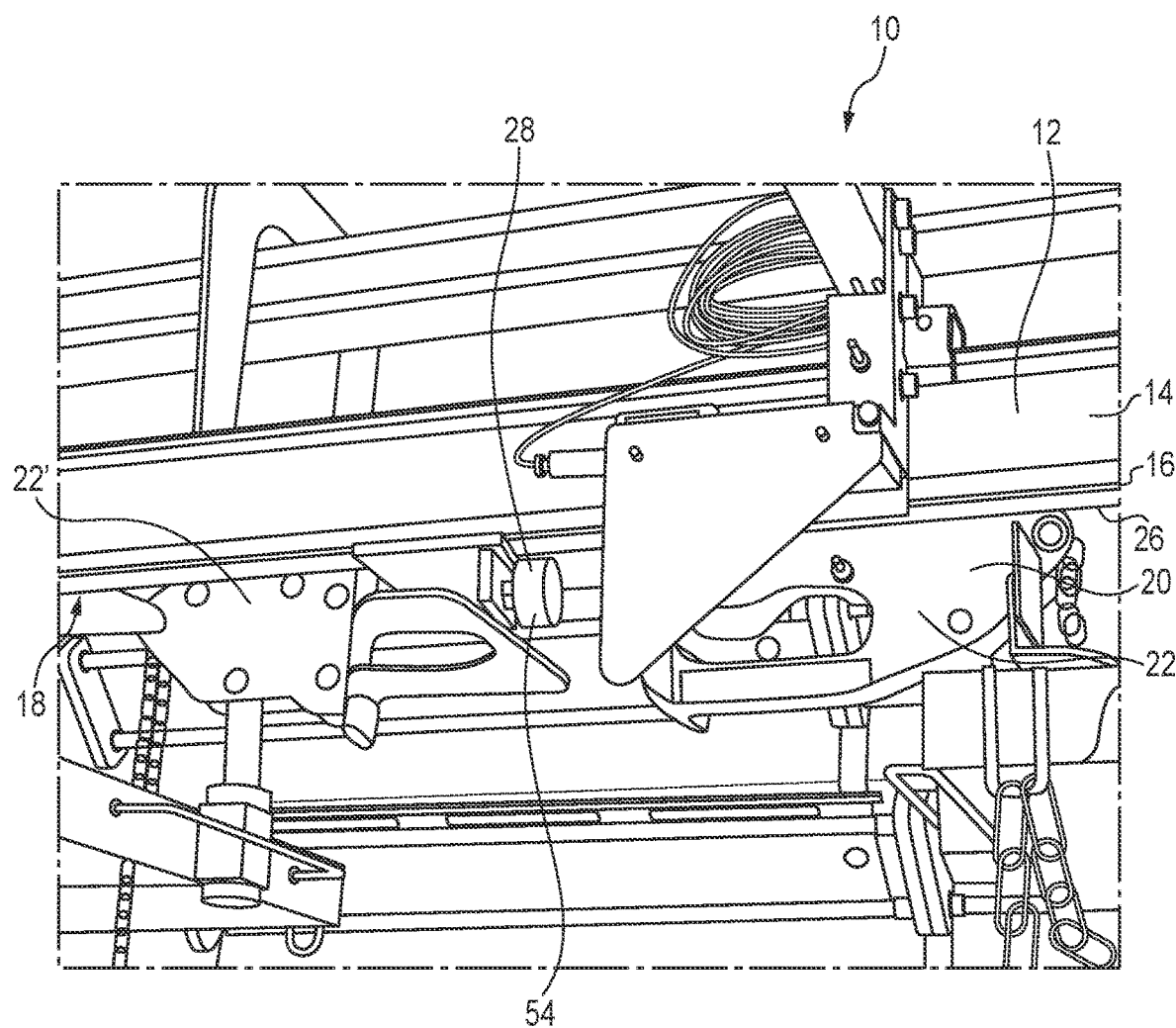
FIG. 2 is a perspective side view of an overhead rail system with a stopper.
Figure 3:
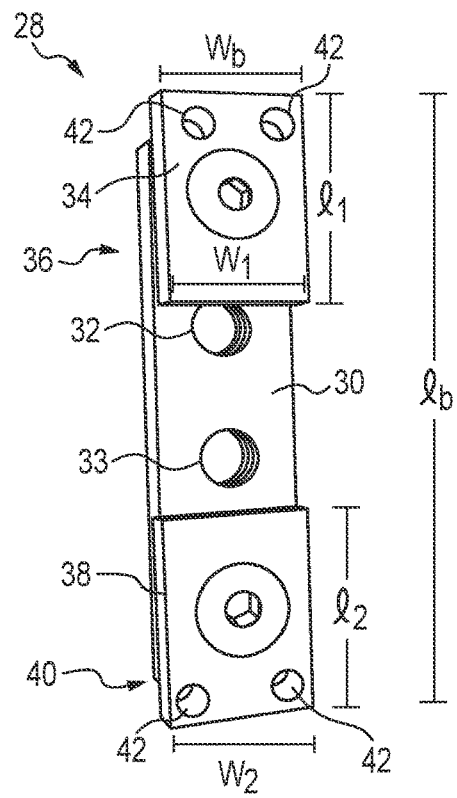
FIG. 3 is a bottom view of a base of the stopper with wings in a first position.
Figure 4:
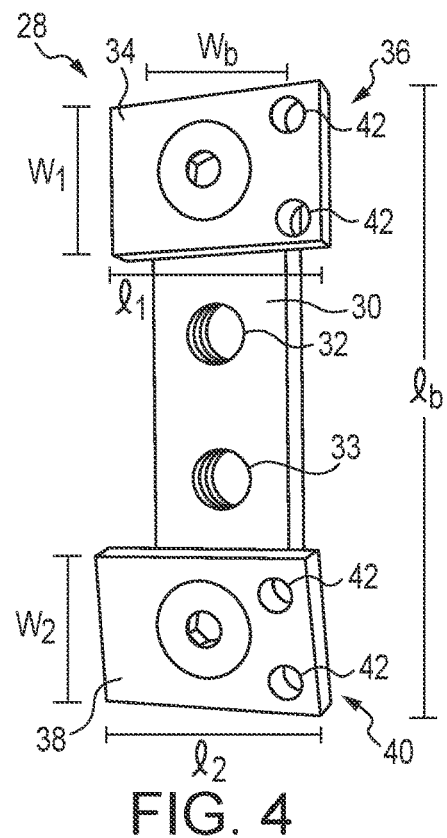
FIG. 4 is a bottom view of the base of the stopper with wings in a second position.

However, there may be a need to locate a stopper 28 in the overhead rail 12, illustrated in FIG. 2, to prevent the component 20 from being rolled to location where it does not belong, exiting the overhead rail 12 at a terminus, or colliding with some other component 22' located in the overhead rail system 10. In order to facilitate the conversion of manufacturing environment from one configuration to another, there is a need to move the stopper 28 from one location to another without having to remove heavy components 22, 22' during the conversion process To facilitate the conversion process, the stopper 28, illustrated in FIGS. 3-6 may include a base 30 having a thickness tb less than a width wc of the channel 16 of the overhead rail 12. The stopper 28 also is defined by a base length $l_b$ and a base width $w_b$. As illustrated in FIGS. 3-4, the base 30 also includes two countersunk threaded holes 32, 33.

The stopper 28 further includes a first wing 34 having a first length greater than a first width $w_1$ that is rotatably attached to a first end 36 of the base 30. The first wing 34 is rotatable approximately 90 degrees between a first position, as illustrated in FIG. 3, and a second position, as illustrated in FIG. 4. The first width $w_1$ of the first wing 34 is substantially equal to the base width $w_b$, and the first width $w_1$ and the base width $w_b$ are aligned parallel in the first position as illustrated in FIG. 3. The first length $l_1$ of the first wing 34 is greater than the base width $w_b$, and the first length $l_1$ and the base width $w_b$ are aligned parallel in the second position as illustrated in FIG. 4.

The stopper also includes a second wing 38 having a first length $l_2$ greater than a first width $w_2$ that is rotatably attached to a second end 40 of the base 30. The second wing 38 is rotatable approximately 90 degrees between a first position, as illustrated in FIG. 3, and a second position, as illustrated in FIG. 4. The second width $w_2$ of the second wing 38 is substantially equal to the base width $w_b$, and the second width $w_2$ and the base width $w_b$ are aligned parallel in the first position as illustrated in FIG. 3. The second length $l_2$ of the second wing 38 is greater than the base width $w_b$, and the second length $l_2$ and the base width $w_b$ are aligned parallel in the second position as illustrated in FIG. 4.

The first length $l_1$ of the first wing 34 and the second length $l_2$ of the second wing 38 are further greater than the width we of the channel 16 of the overhead rail, which secures the base 30 of the stopper 28 inside the overhead rail 12 when the first and second wings 34, 38 are in the second position.

Each of the first and second wings 34, 38 may also include holes 42 drilled into the first and second wings 34, 38 to enable a tool, such as a screwdriver or any other suitable tool, to aid in the rotation for the first and second wings 34, 38 from the first position to the second position.

Figure 5:
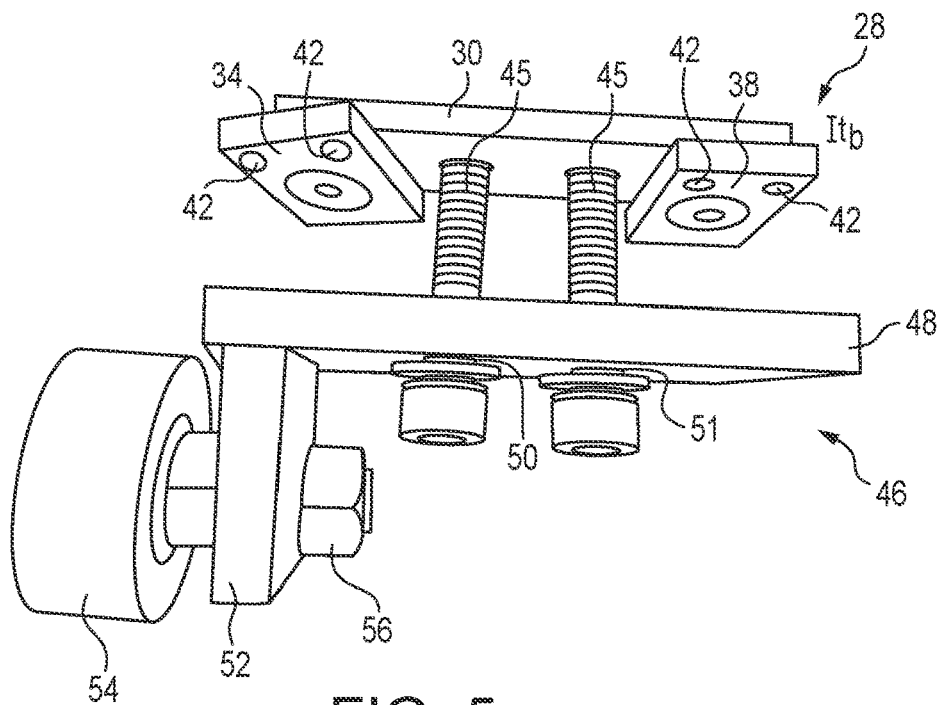
FIG. 5 is a side view of the stopper.
Figure 6:
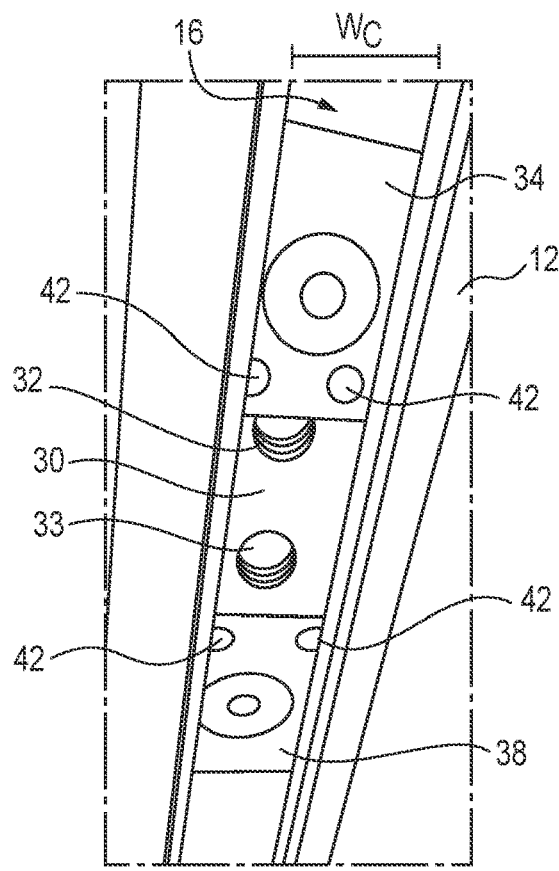
FIG. 6 is a bottom view of a rail of the overhead rail system with the base of the stopper installed in the rail.

As shown in FIG. 5, the stopper 28 may further include a first bolt 44 disposed in the first countersunk threaded hole 32 when the first wing 34 is in the second position. The first bolt 44 prevents rotation of the first wing 34 from the second position to the first position. The stopper 28 may also include a second bolt 45 disposed in the second countersunk threaded hole 33 when the second wing 38 is in the second position. The, the second bolt 45 prevents rotation of the second wing 38 from the second position to the first position. The first and second bolts 44, 45 prevent rotation by interfering with the first and second lengths $l_1$, $l_2$ of the first and second wings 34, 38 respectively during an attempted rotation from the second position to the first position.

Besides securing the base 30 of the stopper 28 in the overhead rail 12, the first and second bolts 44, 45 attach a rail stopper 46 to the base 30 to complete the stopper 28. The rail stopper 46, shown in FIG. 5 and further illustrated in FIG. 2, includes a rail stopper base 48 having first and second holes 50, 51 through which the first and second bolts 44, 45 are disposed. The first and second bolts 44, 45 are disposed through the channel 16 of the overhead rail 12 to connect the base 30 disposed in the overhead rail 12 and the rail stopper 46 that hangs from the base 30 beneath the overhead rail 12 as illustrated in FIG. 2.

A bumper base 52 is disposed from a distal end 54 of the rail stopper base 48. Finally, a bumper 54, made from a soft plastic, rubber, or polymer material, such as urethane, polyurethane, or the like, may be attached to the bumper base 52 by a fastener 56, such as bolt and nut or any other suitable fastener, for engaging a component 20 disposed on the overhead rail system 10.

The stopper 28 may be disassembled to be removed or relocated by removing first and second bolts 44, 45 and removing the rail stopper 46. The first and second wings 34, 38 may them be rotated from the second position to the first position, and the base portion 30 removed from the overhead rail 12 through the channel 16.

Reference in the specification to "one embodiment" or to "an embodiment" means that a particular feature, structure, or characteristic described in connection with the embodiments is included in at least one embodiment. The appearances of the phrase "in one embodiment" or "an embodiment" in various places in the specification are not necessarily all referring to the same embodiment.

In addition, the language used in the specification has been principally selected for readability and instructional purposes, and may not have been selected to delineate or circumscribe the inventive subject matter. Accordingly, the disclosure of the embodiments is intended to be illustrative, but not limiting, of the scope of the embodiments, which is set forth in the claims.

While particular embodiments and applications have been illustrated and described herein, it is to be understood that the embodiments are not limited to the precise construction and components disclosed herein and that various modifications, changes, and variations may be made in the arrangement, operation, and details of the methods and apparatuses of the embodiments without departing from the spirit and scope of the embodiments as defined in the appended claims.

What is claimed is:

1. A stopper for an overhead rail of an overhead rail system, the overhead rail comprising a hollow tube having a channel running longitudinally along a bottom surface of the overhead rail, the stopper comprising:
    a base, the base having a thickness less than a width of the channel of the overhead rail, a base length, a base width and a first countersunk threaded hole; and
    a first wing having a first length greater than a first width, the first wing being rotatably attached to a first end of the base.

2. The stopper of claim 1 wherein the first wing is rotatable approximately 90 degrees between a first position and a second position.

3. The stopper of claim 2 wherein the first width of the first wing is substantially equal to the base width, and the first width and the base width are aligned in the first position.

4. The stopper of claim 3 wherein the first length of the first wing is greater than the base width, and the first length and the base width are aligned in the second position.

5. The stopper of claim 4 further comprising:
    a second wing having a second length greater than a second width, the second wing being rotatably attached to a second end of the base.

6. The stopper of claim 5 wherein the second wing is rotatable approximately 90 degrees between a first position and a second position.

7. The stopper of claim 6 wherein the second width of the second wing is substantially equal to the base width, and the second width and the base width are aligned in the first position.

8. The stopper of claim 7 wherein the second length of the second wing is greater than the base width, and the second length and the base width are aligned in the second position.

9. The stopper of claim 8 further comprising:
    a first bolt disposed in the first countersunk threaded hole when the first wing is in the second position, the first bolt preventing rotation of the first wing from the second position to the first position.

10. The stopper of claim 9 wherein the base further comprises a second countersunk threaded hole, further comprising:
    a second bolt disposed in the second countersunk threaded hole when the second wing is in the second position, the second bolt preventing rotation of the second wing from the second position to the first position.

11. The stopper of claim 10 further comprising:
    a rail stopper attached to the first bolt and second bolt.

12. The stopper of claim 11 wherein the rail stopper comprises:
a rail stopper base having first and second holes through which the first and second bolts are disposed;
a bumper base disposed from a distal end of the rail stopper base; and
a bumper attached to the bumper base for engaging a component disposed on the overhead rail system.

13. An overhead rail system for a manufacturing facility, comprising:
an overhead rail comprising:
a hollow tube having a channel running longitudinally along a bottom surface of the overhead rail; and
a stopper comprising:
a base, the base having a thickness less than a width of the channel of the overhead rail, a base length, a base width and first and second countersunk threaded holes; and
a first wing having a first length greater than a first width, the first wing being rotatably attached to a first end of the base and rotatable approximately 90 degrees between a first position and a second position.

14. The system of claim 13 wherein:
the first width of the first wing is substantially equal to the base width, and the first width and the base width are aligned in the first position; and
the first length of the first wing is greater than the base width, and the first length and the base width are aligned in the second position.

15. The system of claim 14 further comprising:
a second wing having a second length greater than a second width, the second wing being rotatably attached to a second end of the base and rotatable approximately 90 degrees between a first position and a second position.

16. The system of claim 15 wherein:
the second width of the second wing is substantially equal to the base width, and the second width and the base width are aligned in the first position; and
the second length of the second wing is greater than the base width, and the second length and the base width are aligned in the second position.

17. The system of claim 16 further comprising:
a first bolt disposed in the first countersunk threaded hole when the first wing is in the second position, the first bolt preventing rotation of the first wing from the second position to the first position; and
a second bolt disposed in the second countersunk threaded hole when the second wing is in the second position, the second bolt preventing rotation of the second wing from the second position to the first position.

18. The system of claim 17 further comprising:
a rail stopper attached to the first bolt and second bolt, comprising:
a rail stopper base having first and second holes through which the first and second bolts are disposed;
a bumper base disposed from a distal end of the rail stopper base; and
a bumper attached to the bumper base for engaging a component disposed on the overhead rail system.

19. A stopper for an overhead rail of an overhead rail system, the overhead rail comprising a hollow tube having a channel running longitudinally along a bottom surface of the overhead rail, the stopper comprising:
a base, the base having a thickness less than a width of the channel of the overhead rail, a base length, a base width and first and second countersunk threaded holes;
a first wing having a first length greater than a first width, the first wing being rotatably attached to a first end of the base and rotatable approximately 90 degrees between a first position and a second position; and
a second wing having a second length greater than a second width, the second wing being rotatably attached to a second end of the base and rotatable approximately 90 degrees between a first position and a second position.

20. The stopper of claim 19 wherein:
the first width of the first wing is substantially equal to the base width, and the first width and the base width are aligned in the first position and the first length of the first wing is greater than the base width, and the first length and the base width are aligned in the second position; and
the second width of the second wing is substantially equal to the base width, and the second width and the base width are aligned in the first position and the second length of the second wing is greater than the base width, and the second length and the base width are aligned in the second position.

\* \* \* \* \*